US010510140B2

(12) United States Patent
Cauvin et al.

(10) Patent No.: US 10,510,140 B2
(45) Date of Patent: Dec. 17, 2019

(54) METHOD FOR TONE ADAPTING AN IMAGE TO A TARGET PEAK LUMINANCE $L_T$ OF A TARGET DISPLAY DEVICE

(71) Applicant: THOMSON Licensing, Issy-les-Moulineaux (FR)

(72) Inventors: Laurent Sidney Cauvin, Chevaigne (FR); Tania Pouli, Le Rheu (FR); Jonathan Kervec, Paimpont (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/016,583

(22) Filed: Jun. 23, 2018

(65) Prior Publication Data
US 2018/0374202 A1 Dec. 27, 2018

(30) Foreign Application Priority Data
Jun. 23, 2017 (EP) .................................. 17305778

(51) Int. Cl.
*G06T 5/00* (2006.01)

(52) U.S. Cl.
CPC .... *G06T 5/009* (2013.01); *G06T 2207/20208* (2013.01)

(58) Field of Classification Search
None
See application file for complete search history.

(56) References Cited

U.S. PATENT DOCUMENTS

| 8,289,412 B2 | 10/2012 | Banterle et al. |
| 2010/0046612 A1 | 2/2010 | Sun et al. |

FOREIGN PATENT DOCUMENTS

| EP | 3136737 | 3/2017 |
| WO | WO2012122425 | 9/2012 |
| WO | WO2013046095 | 4/2013 |

(Continued)

OTHER PUBLICATIONS

Banterle et al., "A Framework for Inverse Tone Mapping", The Visual Computer, vol. 23, No. 7, May 2007, pp. 467-478.

(Continued)

*Primary Examiner* — Michelle Chin
(74) *Attorney, Agent, or Firm* — Brian J Dorini; Patricia A. Verlangieri

(57) ABSTRACT

An image processing method is described. The method includes obtaining low dynamic range expansion exponents $E_{LDR}(p)$, obtaining target expansion exponents $E_T(p)$ as a weighted sum of the high dynamic range expansion exponents $E_{HDR}(p)$ and of the low dynamic range expansion exponents $E_{LDR}(p)$, applying obtained target expansion exponent $E_T(p)$ to low dynamic range luminance values $Y_{LDR}$ of a low dynamic range version of the image, resulting in target luminance values $Y_T$, and building a tone-adapted version of said image based on said target luminance values $Y_T$.

5 Claims, 1 Drawing Sheet

(56) References Cited

FOREIGN PATENT DOCUMENTS

| WO | WO2015077329 | 5/2015 |
|----|--------------|--------|
| WO | WO2015096955 | 7/2015 |
| WO | WO2016091406 | 6/2016 |
| WO | WO2017032822 | 3/2017 |
| WO | WO2017036908 | 3/2017 |
| WO | WO2017190850 | 11/2017 |

OTHER PUBLICATIONS

Huo et al., "Inverse Tone Mapping Based upon Retina Response", The Scientific World Journal, vol. 2014, Article ID 168564, Mar. 12, 2014, pp. 1-6.

Banterle et al., "High Dynamic Range Imaging and Low Dynamic Rarige Expanaion for Generating HDR Content", Computer Graphics Forum, vol. 28, No. 8, Dec. 2009, pp. 2343-2367.

METHOD FOR TONE ADAPTING AN IMAGE TO A TARGET PEAK LUMINANCE $L_T$ OF A TARGET DISPLAY DEVICE

REFERENCE TO RELATED EUROPEAN APPLICATION

This application claims priority from European Patent Application No. 17305778.7, entitled "METHOD FOR TONE ADAPTING AN IMAGE TO A TARGET PEAK LUMINANCE $L_T$ OF A TARGET DISPLAY DEVICE", filed on Jun. 23, 2017, the contents of which are hereby incorporated by reference in its entirety.

TECHNICAL FIELD

The invention relates to the dynamic range transformation of images, and in particular but not exclusively, to image processing to generate High Dynamic Range images from at least Low Dynamic Range images.

BACKGROUND ART

It is known, notably from WO2015/096955, to convert luminance values $Y_{LDR}$ of colors of a low dynamic range (LDR) version of an image into expanded luminance values $Y_{HDR}$ for generating colors of a corresponding high dynamic range (HDR) version of this image, by scaling exponentially these low dynamic range luminance values $Y_{LDR}$ (or low pass filtered luminance values $Y_{LDR\text{-}LPF}$) using an exponent function with an exponent. For each pixel p of the LDR image, a value of the exponent $E_{HDR}(p)$ can be computed, for instance as disclosed in WO2015/096955, WO2017/032822 and WO2017/036908. Values of this exponent $E_{HDR}(p)$ for each pixel of the image forms an expansion exponent map.

Such an exponential inverse Tone Mapping (iTM) can then be summarized by the following equation:

$$Y_{HDR}(p) = Y'_{LDR}(p)^{E_{HDR}(p)} \times Y_S(p) \quad (1a)$$

where $Y'_{LDR}(p)$ can be equal to the low dynamic range luminance value of the color of the pixel p of the image, namely $Y_{LDR}(p)$ or, for instance, to a low pass filtered luminance value of the same color as disclosed for instance in WO2017/190850;

where $Y_S(p)$ is a scaling function, for instance adapted as disclosed in WO2015/096955 to enhance details that may have been smoothed by the luminance expansion, and/or for denoising the expanded version of the image.

A LDR version of an image is generally provided such that the range of luminance values of its colors are all inferior or equal to a low peak luminance level $L_{LDR}$ which correspond to the maximum luminance that a LDR display device can display. If such a LDR version is coded using $B_{LDR}$ bits, the low peak luminance level $L_{SDR}$ corresponds to the coded value $2^B{}_{LDR}-1$. If $B_{LDR}=10$ and if $L_{LDR}=100$ nits, the coded value 1023 corresponds to 100 nits.

As generated for instance as described above, a HDR version of an image is such that the range of luminance values of its colors are all inferior or equal to a higher peak luminance level $L_{HDR}$ which correspond to the maximum luminance that a given HDR display device can display. It means that a given HDR version of an image is specifically adapted to be displayed by display devices having a peak luminance level equal to $L_{HDR}$. If such a HDR version is coded using $B_{HDR}$ bits, the high peak luminance level $L_{HDR}$ corresponds to the coded value $2^B{}_{HDR}-1$. If $B_{HDR}=12$ and if $L_{HDR}=1000$ nits, the coded value 4095 corresponds to 1000 nits.

A problem arises when an image has to be displayed by a target display device having a target peak luminance $L_T$ different from the low peak luminance level $L_{LDR}$ and different from the high peak luminance level $L_{HDR}$, whenever $L_{LDR} < L_T < L_{HDR}$) or $L_T > L_{HDR}$. Namely, this problem is the tone adaptation of an image to a target peak luminance $L_T$ different from the high peak luminance level $L_{HDR}$ for which the HDR image has been or can be generated.

The document WO2013/046095 discloses several solutions to solve this problem.

SUMMARY OF INVENTION

An object of the invention is to solve the above problem notably in the context of exponential inverse Tone Mapping.

For this purpose, a subject of the invention is an image processing method for tone adapting an image to a target peak luminance $L_T$ of a target display device from a low dynamic range version of this image adapted to be displayed on a display device having a low peak luminance $L_{LDR}$, and from high dynamic range expansion exponents $E_{HDR}(p)$ to be applied to low dynamic range luminance values $Y_{LDR}$ or to low pass filtered luminance values of said low dynamic range version of said image to get expanded luminance values $Y_{HDR}$ of a high dynamic range version of said image adapted to be displayed on a display device having a high peak luminance $L_{HDR}$, said method comprising:

obtaining, preferably by computing, low dynamic range expansion exponents $E_{LDR}(p)$ such that, when applied to low dynamic range luminance values $Y_{LDR}$ or to low pass filtered luminance values of said low dynamic range version of said image, low dynamic range luminance values $Y_{LDR}$ are linearly scaled within a high dynamic range [0, $L_{HDR}$], obtaining, preferably by computing, target expansion exponents $E_T(p)$ as a weighted sum of the high dynamic range expansion exponents $E_{HDR}(p)$ and of the obtained low dynamic range expansion exponents $E_{LDR}(p)$, with a weight $0 \leq \alpha_{in} \leq 1$ of the high dynamic range expansion exponent $E_{HDR}(p)$ which is proportional to a difference between the target peak luminance $L_T$ of the target display device and the low peak luminance $L_{LDR}$, this difference being scaled by another difference between the high peak luminance $L_{HDR}$ and the low peak luminance $L_{LDR}$, applying obtained target expansion exponent $E_T(p)$ to low dynamic range luminance values $Y_{LDR}$ or to low pass filtered luminance values of said low dynamic range version of said image, resulting in target luminance values $Y_T$, building a tone-adapted version of said image based on said target luminance values $Y_T$.

Preferably, high dynamic range expansion exponents $E_{HDR}(p)$, obtained low dynamic range expansion exponents $E_{LDR}(p)$ and obtained target expansion exponents $E_T(p)$ form a first, a second and a third map.

Preferably, the weight of the low dynamic range expansion exponent $E_{LDR}(p)$ is equal to $1-\alpha_{in}$.

A subject of the invention is also an image processing device for tone adapting an image to a target peak luminance $L_T$ of a target display device from a low dynamic range version of this image adapted to be displayed on a display device having a low peak luminance $L_{LDR}$, and from high dynamic range expansion exponents $E_{HDR}(p)$ to be apply to low dynamic range luminance values $Y_{LDR}$ or to low pass filtered luminance values of said low dynamic range version of said image to get expanded luminance values $Y_{HDR}$ of a high dynamic range version of said image adapted to be displayed on a display device having a high peak luminance $L_{HDR}$, said device comprising at least one processor configured for implementing the above method.

A subject of the invention is also an electronic device incorporating this image processing device, as, for instance, a camera, a TV set, a monitor, a head mounted display, a set top box, a gateway, a smartphone and a tablet.

A subject of the invention is also a non-transitory storage medium carrying instructions of program code for executing steps of the above method, when said program is executed on a computing device.

A subject of the invention is also an image processing method for tone adapting an image to a target peak luminance $L_T$ of a target display device from a low dynamic range version of this image adapted to be displayed on a display device having a low peak luminance $L_{LDR}$, and from a high dynamic range version of this image adapted to be displayed on a display device having a high peak luminance $L_{HDR}$, said method comprising:

for each pixel p of said image, computing a target luminance $Y'_T(p)$ based on a weighted sum of a scaled low dynamic range luminance $Y'_{SC\text{-}LDR}(p)$ of this pixel and of the high dynamic range luminance $Y_{HDR}(p)$ of the same pixel in the high dynamic range version of the image, with a weight $0 \leq \alpha_{in} \leq 1$ of the high dynamic range expansion exponent $E_{HDR}(p)$ which is proportional to a difference between the target peak luminance $L_T$ of the target display device and the low peak luminance $L_{LDR}$, this difference being scaled by another difference between the high peak luminance $L_{HDR}$ and the low peak luminance $L_{LDR}$, wherein said scaled low dynamic range luminance $Y'_{SC\text{-}LDR}(p)$ is obtained by scaling linearly low dynamic range luminance value of the same pixel $Y_{LDR}(p)$ within a low dynamic range $[0, L_{LDR}]$ building a tone-adapted version of said image based on said target luminance values $Y_T$.

A subject of the invention is also an image processing device configured to implement this method and an electronic device incorporating this image processing device.

BRIEF DESCRIPTION OF DRAWINGS

The invention will be more clearly understood on reading the description which follows, given by way of non-limiting examples and with reference to the appended figure.

DESCRIPTION OF EMBODIMENTS

Figure 1:
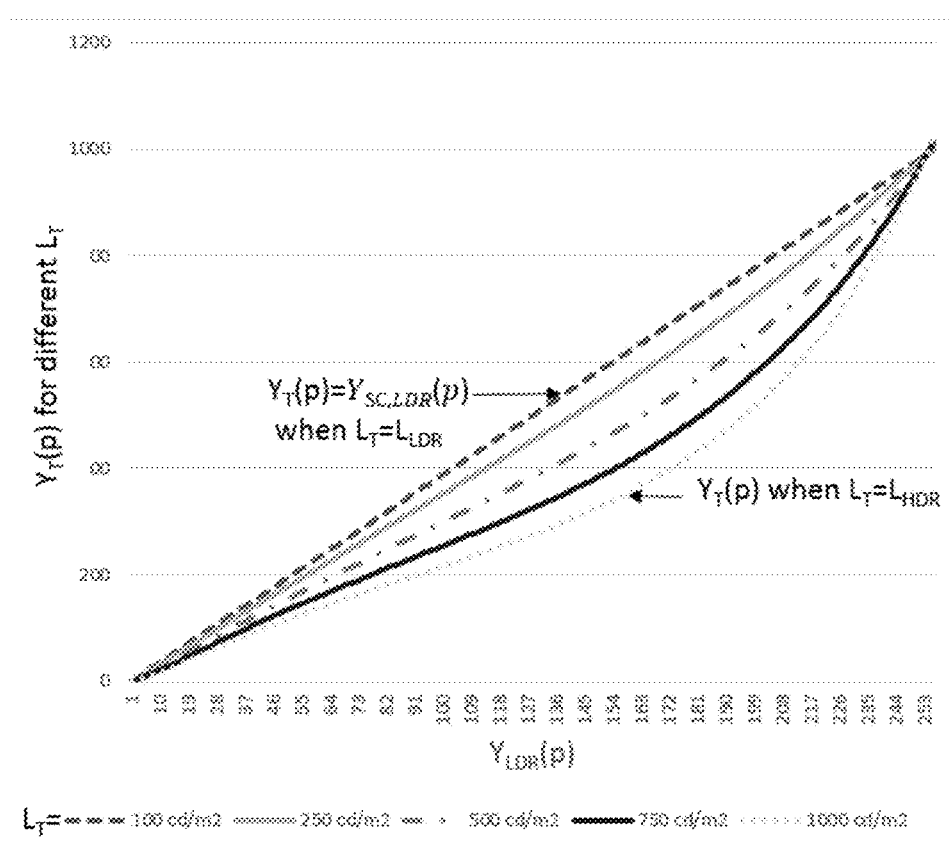
FIG. 1 illustrates tone expansion of LDR luminance values $Y_{LDR}(p)$ into target luminance values $Y_T(p)$ of pixels p of the image, for difference values of the target peak luminance $L_T$, according to the first embodiment of the tone adaptation of this image.

The functions of the various elements shown in the figures may be provided through the use of dedicated hardware as well as hardware capable of executing software in association with appropriate software.

It is to be understood that the invention may be implemented in various forms of hardware, software, firmware, special purpose processors, or combinations thereof. The term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage. The invention may be notably implemented as a combination of hardware and software. Moreover, the software may be implemented as an application program tangibly embodied on a program storage unit. Such a software can take the form of a plug-in to be integrated to another software. The application program may be uploaded to, and executed by, an image processing device comprising any suitable architecture.

Preferably, the image processing device is implemented on a computer platform having hardware such as one or more central processing units ("CPU") or processors, a random-access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. The computer platform is connected to a target display device having its target peak luminance $L_T$. In addition, various other peripheral units may be connected to the computer platform such as an image reception device configured to receive images, an additional data storage unit configured to store image data, a remote-control unit, . . . This image processing device may be part of an electronic device able to receive and/or store images, for instance a camera, a TV set, a set-top-box, a monitor, a gateway, a smartphone, a tablet, a head-mounted display.

All components of this image processing device for the tone adaptation of an image are configured in a manner known per se to implement the different steps of the first or second embodiments of the method described hereafter.

$1^{st}$ Embodiment

In this first embodiment, it is assumed that the image processing device receives and/or stores the following data:
a LDR version of an image adapted to be displayed by a LDR display device having a low peak luminance $L_{LDR}$, providing a LDR luminance value $Y_{LDR}(p)$ for each pixel of the image; such a LDR version is generally binary coded over $B_{LDR}$ bits (ex.: 8 bits, corresponding to 256 different values);
a map of HDR expansion exponents $E_{HDR}(p)$ to be used to expand luminance values of the LDR version for generating a HDR version to be displayed by a HDR display device having a high peak luminance $L_{HDR}$; such a HDR version will be generally binary coded within a wider range $[0, N_{HDR}]$ (ex.: 10 bits, corresponding to 1024 different values).
the target peak luminance $L_T$ of the target display device connected to this image processing device (or to be connected to it).

In order to compare the LDR version to the HDR version of the same image, in a first step of this embodiment, luminance values of the LDR version are linearly scaled within a high dynamic range $[0, L_{HDR}]$ to get scaled LDR luminance values $Y_{SC\text{-}LDR}(p)$. The goal of this scaling step is to scale luminance values of the LDR version over the range of the luminance values of the HDR version. We will scale for instance these LDR luminance values $Y_{SC\text{-}LDR}(p)$ over an interval $[0, N_{LDR}]$ (corresponding for instance to 256 different values) according to:

$$Y_{sc,LDR}(p) = Y_{LDR}(p) * \frac{L_{HDR}}{N_{LDR}} \quad (2)$$

The ratio $$\frac{L_{HDR}}{N_{LDR}}$$

is the scaling ratio.

$N_{LDR}$ may be related to the number of bits $B_{LDR}$ over which the luminance values of the LDR version are coded, and then $N_{LDR}=2^{B}{}_{LDR}-1$. $N_{LDR}$ may be independent from the number of bits $B_{LDR}$.

The straight dotted line of FIG. 1 illustrates the variation of $Y_{sc,LDR}(p)$ in function of $Y_{LDR}(p)$.

Still in this first step, LDR expansion exponents $E_{LDR}(p)$ are computed such as to approximate these scaled LDR luminance values $Y_{sc,LDR}(p)$ such that:

$$Y_{sc,LDR}(p) = Y_{LDR}(p)^{E_{LDR}(p)} \quad (1b)$$

These obtained LDR expansion exponent values $E_{LDR}(p)$ then forms a map.

Therefore, we have:

$$Y_{LDR}(p)^{E_{LDR}(p)} = Y_{LDR}(p) * \frac{L_{HDR}}{N_{LDR}} \quad (3)$$

Or: $E_{LDR}(p) * \log(Y_{LDR}(p)) = \log(Y_{LDR}(p)) + \log\left(\frac{L_{HDR}}{N_{LDR}}\right) \quad (4)$ such that the map of LDR expansion exponents $E_{LDR}(p)$ is computed as follows:

$$E_{LDR}(p) = 1 + \frac{\log\left(\frac{L_{HDR}}{N_{LDR}}\right)}{\log(Y_{LDR}(p))} \quad (5a)$$

Since in equation (5a) we divide by $\log(Y(i))$ attention is needed to avoid a division by zero. As such, we instead define $E_{SDR}$ as follows:

$$E_{LDR}(p) = \begin{cases} 1, & Y(p) = 1 \\ 1 + \frac{\log\left(\frac{L_{HDR}}{N_{LDR}}\right)}{\log(Y_{LDR}(p))}, & \text{otherwise} \end{cases} \quad (5b)$$

In summary, in this first step, a map of low dynamic range expansion exponents $E_{LDR}(p)$ is computed such that, when applied to low dynamic range luminance values $Y_{LDR}$ (or low pass filtered luminance values) of the low dynamic range version of the image, low dynamic range luminance values $Y_{LDR}$ are scaled by a factor $$\frac{L_{HDR}}{N_{LDR}}.$$

In a second step, for each pixel p of the image, target expansion exponent values $E_T(p)$ are computed as a weighted sum of the HDR expansion exponent $E_{HDR}(p)$ and of the LDR expansion exponent $E_{LDR}(p)$ :

$$E_T(p) = \alpha_{in} E_{HDR}(p) + (1-\alpha_{in}) E_{LDR}(p) \quad (6)$$

with a weight $0 \leq \alpha_{in} \leq 1$ of the HDR expansion exponent $E_{HDR}(p)$ which is proportional to the difference between the target peak luminance $L_T$ of the target display device and the low peak luminance $L_{LDR}$, this difference being scaled by the difference between the high peak luminance $L_{HDR}$ and the low peak luminance $L_{LDR}$. This weight $\alpha_{in}$ is preferably computed as follows:

$$\alpha_{in} = \frac{L_T - L_{LDR}}{L_{HDR} - L_{LDR}} \quad (7)$$

An interpolated expansion exponent map $E_T(p)$ is then obtained.

In a third step, luminance values of the LDR image are expanded into target luminance values $Y_T$ for generating colors of a corresponding target range image, by scaling exponentially these low dynamic range luminance values $Y_{LDR}$ (or low pass filtered luminance values $Y_{LDR-LPF}$) using an exponent function with an exponent based on the target expansion exponent map $E_T(p)$. Such an inverse Tone Mapping (iTM) can then be summarized by the following equation:

$$Y_T(p) = Y'_{LDR}(p)^{E_T(p)} \times Y_S(p) \quad (8), \text{ or, using equation 6:}$$

$$Y_T(p) = Y'_{LDR}(p)^{\alpha_{in} E_{HDR}(p) + (1-\alpha_{in}) E_{LDR}(p)} \times Y_S(p) \quad (8b)$$

where $Y'_{LDR}(p)$ can be equal to the low dynamic range luminance value of the color of the pixel p, namely $Y_{LDR}(p)$, or, for instance, to a low pass filtered luminance value of the same color;

where $Y_S(p)$ is a scaling function, for instance adapted as disclosed in WO2015/096955 to enhance details that may have been smoothed by the luminance expansion, and/or for denoising the expanded image.

Note that, when $Y'_{LDR}(p) = Y_{LDR}(p)$, equation 8b above combined with equation 3 can also be written as:

$$Y_T(p) = Y_{LDR}(p)^{\alpha_{in} E_{HDR}(p) + (1-\alpha_{in})} \times K^{(1-\alpha_{in})} \times Y_S(p) \quad (8c), \text{ with}$$

$$K = \frac{L_{HDR}}{N_{LDR}}$$

In this equation 8c, the target expanded luminance $Y_T(p)$ is based on a linear combination of a HDR expansion gain and of a LDR expansion gain, which is multiplied by a constant factor $K^{(1-\alpha_{in})}$.

FIG. 1 illustrates the variation of the target luminance values $Y_T(p)$ in function of the low dynamic range luminance values $Y_{LDR}(p) = Y'_{LDR}(p)$ for different values of the target peak luminance $L_T = 100, 250, 500, 750$ and $1000$ cd/m², when $L_{LDR} = 100$ cd/m2 and $L_{HDR} = 1000$ cd/m².

In a fourth step, a tone-adapted version of the image is built in a manner known per se, based on the target luminance values $Y_T$. For instance, the expanded luminance value $Y_T$ of each pixel is combined with its chromatic channels for instance as described in WO2015/096955. A target range image is then obtained that can be sent from the image processing device to the target display to be displayed. Advantageously, the tone-adapted target version of the image that is obtained is specifically tone adapted to the peak luminance value $L_T$ of the target display.

This first embodiment is preferred because expansion can be encoded using a look-up table taking luminance values of the LDR image as input (for instance, coded over 8 bits in the interval [0-255] or over 10 bits in the interval [0-1023]) and giving expanded luminance. Since this is a relatively small amount of data, the interpolation is much more efficient than interpolating every pixel of the image, irrespective of what is in the images to be interpolated. Additionally, compared to the second variant of the second embodiment below, this embodiment avoids double application of the iTM.

2$^{nd}$ Embodiment

In this second embodiment, it is also assumed that the image processing device receives and/or stores the following data:
as in the first embodiment above, a LDR version of an image adapted to be displayed by a LDR display device having a low peak luminance $L_{LDR}$, providing a LDR luminance value $Y_{LDR}(p)$ for each pixel of the image;
a HDR version of the image adapted to be displayed with a HDR display device having a high peak luminance value $L_{HDR}$, providing a HDR luminance value $Y_{HDR}(p)$ for each pixel of the image;
as in the first embodiment above, the target peak luminance $L_T$ of the target display device connected to this image processing device (or to be connected to it).

In this second embodiment, for each pixel p of the image, we will process as follows.

In a first step, in order to compare the LDR version to the HDR version of the same image, luminance values of the LDR version are linearly scaled within a low dynamic range $[0, L_{LDR}]$ to get scaled LDR luminance values $Y'_{SC-LDR}(p)$. As in the first embodiment, independently or not from the number of bits $B_{LDR}$ over which the luminance values of the LDR version are coded, we will scale the LDR luminance values $Y'_{SC-LDR}(p)$ over an interval $[0, N_{LDR}]$ (corresponding for instance to 256 different values) according to:

$$Y'_{SC,LDR}(p) = Y_{LDR}(p) * \frac{L_{LDR}}{N_{LDR}} \quad (9)$$

In a second step, a target luminance value of this pixel $Y'_T(p)$ is computed as a weighted sum of the scaled LDR luminance value $Y'_{SC,LDR}$ computed in the first step and of the HDR luminance value $Y_{HDR}$ of this pixel, such that:

$$Y'_T(p) = \alpha_{in} Y_{HDR}(p) + (1-\alpha_{in}) Y'_{SC-LDR}(p) \quad (10)$$

with a weight $0 \leq \alpha_{in} \leq 1$ of the HDR luminance value $Y_{HDR}(p)$ which is proportional to the difference between the target peak luminance $L_T$ of the target display device and the low peak luminance $L_{LDR}$, this difference being scaled by the difference between the high peak luminance $L_{HDR}$ and the low peak luminance $L_{LDR}$. This weight $\alpha_{in}$ is then preferably computed as follows:

$$\alpha_{in} = \frac{L_T - L_{LDR}}{L_{HDR} - L_{LDR}} \quad (7)$$

In a third step, the target luminance value $Y'_T(p)$ is combined with its chromatic channels for instance as described in WO2015/096955.

A target version of the image is then obtained that can be sent from the image processing device to the target display to be displayed. Advantageously, the target version of the image that is obtained is specifically tone adapted to the peak luminance value $L_T$ of the target display.

This second embodiment is less efficient computationally than the first one in the case where look-up tables are used to implement luminance expansion, as it requires each pixel of the final image to be interpolated. However, in applications where absolute luminance is required at the output, it may be preferred. Given the above formulation if for example $L_t$=500 cd/m$^2$, the values in $Y_{exp,t}$ will range between 0 and 500.

As a first variant of this second embodiment, in the first step, the scaling ratio is $$\frac{L_{HDR}}{N_{LDR}}$$

as in the first embodiment. Scaled LDR luminance values that are obtained are then distributed within the HDR interval $[0, L_{HDR}]$ as the coded luminance values of the LDR version are distributed in the interval $[0, N_{LDR}]$. Therefore, we have:

$$Y_{SC,LDR}(p) = Y_{LDR}(p) * \frac{L_{HDR}}{N_{LDR}} \quad (2)$$

As a second variant of this second embodiment (that may be combined with the first variant), HDR luminance values $Y_{HDR}(p)$ may be computed as in the second step of the first embodiment, from a map of HDR expansion exponents $E_{HDR}(p)$.

It is to be understood that the invention may be implemented in various forms of hardware, software, firmware, special purpose processors, or combinations thereof.

While some of the specific embodiments may be described and claimed separately, it is understood that the various features of embodiments described and claimed herein may be used in combination.

The invention claimed is:

1. An image processing method for tone adapting an image to a target peak luminance $L_T$ of a target display device from a low dynamic range version of this image adapted to be displayed on a display device having a low peak luminance $L_{LDR}$, and from high dynamic range expansion exponents $E_{HDR}(p)$ to be applied to low dynamic range luminance values $Y_{LDR}$ or to low pass filtered luminance values of said low dynamic range version of said image to get expanded luminance values $Y_{HDR}$ of a high dynamic range version of said image adapted to be displayed on a display device having a high peak luminance $L_{HDR}$, said method comprising:
obtaining low dynamic range expansion exponents $E_{LDR}$(p) such that, when applied to low dynamic range luminance values $Y_{LDR}$ or to low pass filtered luminance values of said low dynamic range version of said image, low dynamic range luminance values $Y_{LDR}$ are linearly scaled within a high dynamic range $[0, L_{HDR}]$,
obtaining target expansion exponents $E_T(p)$ as a weighted sum of the high dynamic range expansion exponents $E_{HDR}(p)$ and of the obtained low dynamic range expansion exponents $E_{LDR}(p)$, with a weight $0 \leq \alpha_{in} \leq 1$ of the high dynamic range expansion exponent $E_{HDR}(p)$ and with a weight of the low dynamic range expansion exponent $E_{LDR}(p)$ equal to $(1-\alpha_{in})$, wherein the weight $\alpha_{in}$ of the high dynamic range expansion exponent $E_{HDR}(p)$ is proportional to a difference between the target peak luminance $L_T$ of the target display device and the low peak luminance $L_{LDR}$, this difference being scaled by another difference between the high peak luminance $L_{HDR}$ and the low peak luminance $L_{LDR}$, applying obtained target expansion exponent $E_T(p)$ to low dynamic range luminance values $Y_{LDR}$ or to low pass filtered luminance values of said low dynamic range version of said image, resulting in target luminance values $Y_T$, building a tone-adapted version of said image based on said target luminance values $Y_T$.

2. An image processing device for tone adapting an image to a target peak luminance $L_T$ of a target display device from a low dynamic range version of this image adapted to be displayed on a display device having a low peak luminance $L_{LDR}$, and from high dynamic range expansion exponents $E_{HDR}(p)$ to be apply to low dynamic range luminance values $Y_{LDR}$ or to low pass filtered luminance values of said low dynamic range version of said image to get expanded luminance values $Y_{HDR}$ of a high dynamic range version of said image adapted to be displayed on a display device having a high peak luminance $L_{HDR}$, said device comprising at least one processor configured for:

obtaining low dynamic range expansion exponents $E_{LDR}(p)$ such that, when applied to low dynamic range luminance values $Y_{LDR}$ or to low pass filtered luminance values of said low dynamic range version of said image, low dynamic range luminance values $Y_{LDR}$ are linearly scaled within a high dynamic range $[0, L_{HDR}]$, obtaining target expansion exponents $E_T(p)$ as a weighted sum of the high dynamic range expansion exponents $E_{HDR}(p)$ and of the obtained low dynamic range expansion exponents $E_{LDR}(p)$, with a weight $0 \leq \alpha_{in} \leq 1$ of the high dynamic range expansion exponent $E_{HDR}(p)$ and with a weight of the low dynamic range expansion exponent $E_{LDR}(p)$ equal to $(1-\alpha_{in})$, wherein the weight $\alpha_{in}$ of the high dynamic range expansion exponent $E_{HDR}(p)$ is proportional to a difference between the target peak luminance $L_T$ of the target display device and the low peak luminance $L_{LDR}$, this difference being scaled by another difference between the high peak luminance $L_{HDR}$ and the low peak luminance $L_{LDR}$, applying obtained target expansion exponent $E_T(p)$ to low dynamic range luminance values $Y_{LDR}$ or to low pass filtered luminance values of said low dynamic range version of said image, resulting in target luminance values $Y_T$, building a tone-adapted version of said image based on said target luminance values $Y_T$.

3. An electronic device incorporating the image processing device according to claim 2.

4. The electronic device according to claim 3 selected from the group consisting of a camera, a TV set, a monitor, a head mounted display, a set top box, a gateway, a smartphone and a tablet.

5. A non-transitory storage medium carrying instructions of program code for executing steps of the method according to claim 1, when said program is executed on a computing device.

* * * * *